(12) United States Patent
Turner et al.

(10) Patent No.: US 7,280,990 B2
(45) Date of Patent: Oct. 9, 2007

(54) METHOD AND SYSTEM FOR DESIGNING AND MODELING A PRODUCT IN A KNOWLEDGE BASED ENGINEERING ENVIRONMENT

(75) Inventors: Jon B. Turner, Huntington Beach, CA (US); Victor R. Hambridge, Fountain Valley, CA (US); Rami Reuveni, Irvine, CA (US)

(73) Assignee: UGS Corp., Plano, TX (US)

( * ) Notice: Subject to any disclaimer, the term of this patent is extended or adjusted under 35 U.S.C. 154(b) by 891 days.

(21) Appl. No.: 10/213,663

(22) Filed: Aug. 7, 2002

(65) Prior Publication Data
US 2003/0060913 A1    Mar. 27, 2003

Related U.S. Application Data

(60) Provisional application No. 60/310,960, filed on Aug. 7, 2001.

(51) Int. Cl.
*G06N 5/00*    (2006.01)
(52) U.S. Cl. .............................. 706/45; 706/12; 706/16; 706/46; 706/47; 706/50; 700/90; 700/98; 700/103; 700/104; 700/182
(58) Field of Classification Search ................. 706/12, 706/16, 18–20, 45–48, 50–54, 61, 62, 904, 706/909; 700/90, 98, 103, 104, 118, 159, 700/182
See application file for complete search history.

(56) References Cited

U.S. PATENT DOCUMENTS

| | | | | |
|---|---|---|---|---|
| 5,249,135 A | * | 9/1993 | Fujita | 700/179 |
| 5,799,293 A | * | 8/1998 | Kaepp | 706/45 |
| 5,822,206 A | * | 10/1998 | Sebastian et al. | 700/97 |
| 5,847,956 A | * | 12/1998 | Bronfeld et al. | 700/98 |
| 5,859,786 A | * | 1/1999 | Klein | 703/2 |
| 5,880,962 A | * | 3/1999 | Andersson et al. | 700/98 |

OTHER PUBLICATIONS

"Knowledge-Based Engineering Systems: Applying Discipline and Technology for Competitive Advantage", D. H. Brown Associates, Inc., Jul. 29, 1999, Cover Page and pp. 1-28.

* cited by examiner

*Primary Examiner*—Joseph P Hirl
*Assistant Examiner*—Omar F. Fernández Rivas

(57) ABSTRACT

An interactive design system includes a design application that creates and models a geometry of an object. A programming language application defines engineering rules that may be associated with the object. The programming language application associates the geometry of the object with the engineering rules such that any change made to the geometry is automatically reflected in the engineering rules and any change made to the engineering rules is reflected in the geometry. The programming language application may also generate one or more knowledge features that can be used to verify that associated parameter constraints have not been violated as a result of a geometry or engineering rule change before applying the desired changes.

20 Claims, 10 Drawing Sheets

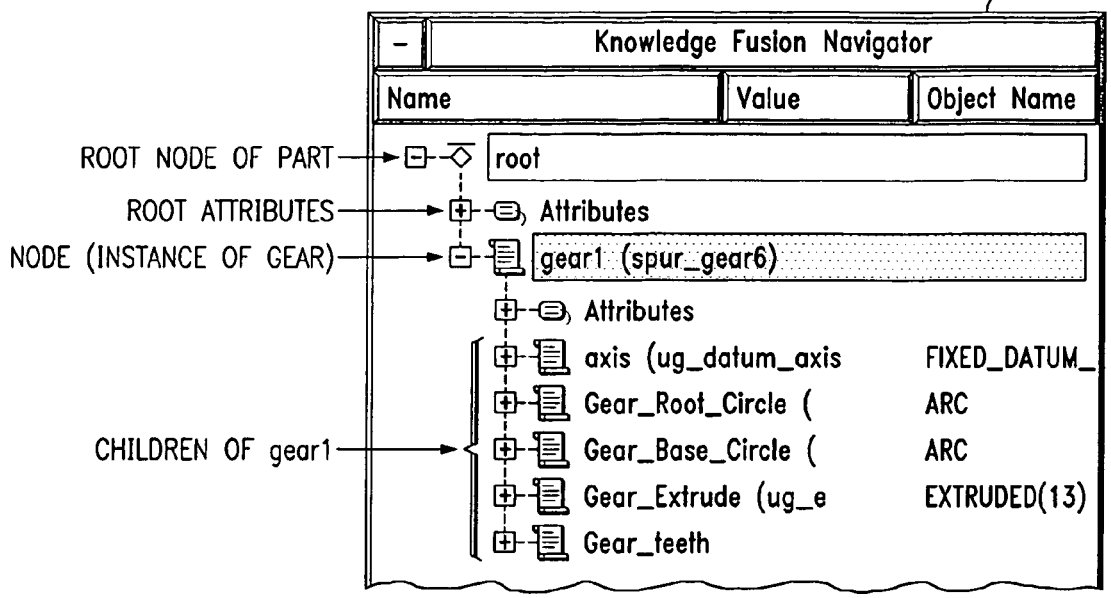

```
Edit...
Add Attribute...
Add Child Rule...
List Dependencies
Inspect
Class Documentation
List Rules
Reload Selected Classes
Reload All
Rebuild Tree
Deleted Rule and Object
Remove Rule Only
```

FIG. 3B

```
Edit...
Add Attribute...
Reference
List Dependencies
Inspect
Class Documentation
Reload This Class
Reload All
Rebuild Tree
Deleted Rule and Object
Remove Rule Only
```

FIG. 3C

```
View...
Show Value
Show Dependents/Dependencies
Delete
Reference
```

FIG. 3D

```
Add Attribute to Root
Add Child Rule to Root
Reload All
Rebuild Tree
Reference by Select
```

FIG. 8A

| UG/KF DATATYPES | | | | | | |
|---|---|---|---|---|---|---|
|  | NUMBER | INTEGER | STRING | POINT VECTOR | FRAME | LIST |
| ACTION BUTTON | O [7] | O [7] | [7] | O | O | O [6] |
| BITMAP |  |  | D |  |  |  |
| BUTTON LAYOUT | O [7] | O [7] | O [7] | O [1] | O [1] | O [1,6] |
| INTEGER |  | D/O | D/O [2] |  |  |  |
| LABEL | D | D | D | D | D |  |
| MULTI-LINE TEXT | D/O | D/O | D/O | D/O | D/O | D/O |
| MULTI-SELECT LIST |  |  |  |  |  |  |
| OPTION MENU |  | D/O [3] | D/O [2,3] |  |  |  |
| RADIO BOX |  | D/O [3] | D/O [2,3] |  |  |  |
| REAL | D/O |  | D/O [2] |  |  |  |
| SCALE INTEGER |  | D/O | D/O [2] |  |  |  |
| SCALE REAL | D/O |  | D/O [2] |  |  |  |
| SCROLLED WINDOW |  |  |  |  |  |  |
| SELECTION BOX |  | O [4] | O [4] |  |  |  |
| SEPARATOR |  |  |  |  |  |  |
| SINGLE SELECT LIST |  | O [5] | O [5] |  |  |  |
| STRING | D/O | D/O | D/O | D/O | D/O | D/O |
| TOGGLE BUTTON |  | D/O | D/O [2] |  |  |  |
| TOOL PALETTE |  | D/O [3] | D/O [2,3] |  |  |  |
| WIDE STRING | D/O | D/O | D/O | D/O | D/O | D/O |

FIG. 8B

| ATTRIBUTE | SUFFIX | UG/KF DATA TYPE |
|---|---|---|
| LABEL | _LABEL | I, N, S, V [1] |
| SENSITIVITY | _SENS | I |
| SCALE MAX LIMIT | _MAX | I, N [2] |
| SCALE MAX LABEL | _MAXL | I, N, S |
| VISIBILITY | _VISI | I |
| SCALE MIN LIMIT | _MIN | I, N, [2] |
| SCALE MIN LABEL | _MINL | I, N, S |
| SCALE PRECISION | _PREC | I |

FIG. 8C

| USER INTERFACE OBJECT ATTRIBUTES | | | | | |
|---|---|---|---|---|---|
| | LABEL | VISIBILITY | SENSITIVITY | MIN/MAX | PRECISION |
| ACTION BUTTON | X | X | X | | |
| BITMAP | | X | | | |
| BUTTON LAYOUT | | X [1] | X [1] | | |
| INTEGER | X | X | X | | |
| LABEL | | X | X | | |
| MULTI-LINE TEXT | X | X | X | | |
| MULTI-SELECT LIST | | | | | |
| OPTION MENU | X | X [1] | X [1] | | |
| RADIO BOX | X | X [1] | X [1] | | |
| REAL | X | X | X | | |
| SCALE INTEGER | | X | X | X | |

METHOD AND SYSTEM FOR DESIGNING AND MODELING A PRODUCT IN A KNOWLEDGE BASED ENGINEERING ENVIRONMENT

RELATED APPLICATIONS

The present invention claims the benefit of U.S. Provisional Application No. 60/310,960, filed Aug. 7, 2001 which is hereby incorporated herein by reference.

TECHNICAL FIELD OF THE INVENTION

The present invention relates in general to computer aided design techniques and more particularly to a method and system for designing and modeling a product in a knowledge based engineering environment.

BACKGROUND OF THE INVENTION

Computer systems (such as computer aided design (CAD), computer aided manufacture (CAM), and computer aided engineering systems (CAE)) have been developed to interactively generate design, analysis, and manufacturing information for end user products. The capabilities of these systems may be enhanced by permitting the system to utilize various engineering knowledge bases and engineering rules. Engineering knowledge is accessed from and expressed as rules in a programming language. These rules specify parameters that are inputs to digital objects used to generate process specific information. The challenge is to incorporate the engineering rules into a CAD/CAM/CAE system while maintaining a relationship with the existing design model. To date, some programming languages have been developed that can express engineering rules and subsequently generate design models. The execution of such a program results in the creation of the objects that constitute the design and thus these objects must be completely specified by the program. The task of fully describing these objects has two major drawbacks. First, fully describing an object can be very complex and burdensome due to the difficulty in deciphering textual representations of the object. Second, the programming languages are not capable of revising or editing existing information as there is no relationship with an existing design model. Therefore, it is desirable to provide an interactive relationship between the engineering rules and the design object.

SUMMARY OF THE INVENTION

From the foregoing, it may be appreciated by those skilled in the art that a need has arisen for a technique to integrate object geometry and engineering rules in the product design and manufacturing process. In accordance with the present invention, a method and system for designing and modeling a product in a knowledge based engineering environment are provided that substantially eliminate or greatly reduce disadvantages and problems associated with conventional computer aided design techniques.

According to an embodiment of the present invention, there is provided a method for designing and modeling a product in a knowledge based engineering environment that includes receiving or creating a geometry of an object associated with a product. Engineering rules are retrieved that may be associated with the object. The geometry and the engineering rules are associatively connected to one another such that changes to the geometry are automatically reflected in the engineering rules and changes to the engineering rules are automatically reflected in the geometry. A knowledge feature may be defined for the object with parameters that may place certain constraints on the design of the object. The knowledge feature ensures that attempted changes to the geometry or the engineering rules do not violate the constraints placed on the object by the knowledge feature.

The present invention provides various technical advantages over conventional computer aided design techniques. For example, one technical advantage is to provided associative connectivity between the geometry of an object and its associated engineering rules. Another technical advantage is to provide an ability to create and define constraints to be placed on the design of the object. Yet another technical advantage is to generate a description of an object created from an external application. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2 illustrates an object tree dialog box of the interactive design system;

FIGS. 3A-D illustrate pop-up menus for items in the object tree;

FIGS. 8A-C illustrate pre-defined translation sets from user interface objects to engineering rules;

DETAILED DESCRIPTION OF THE INVENTION

Figure 1:
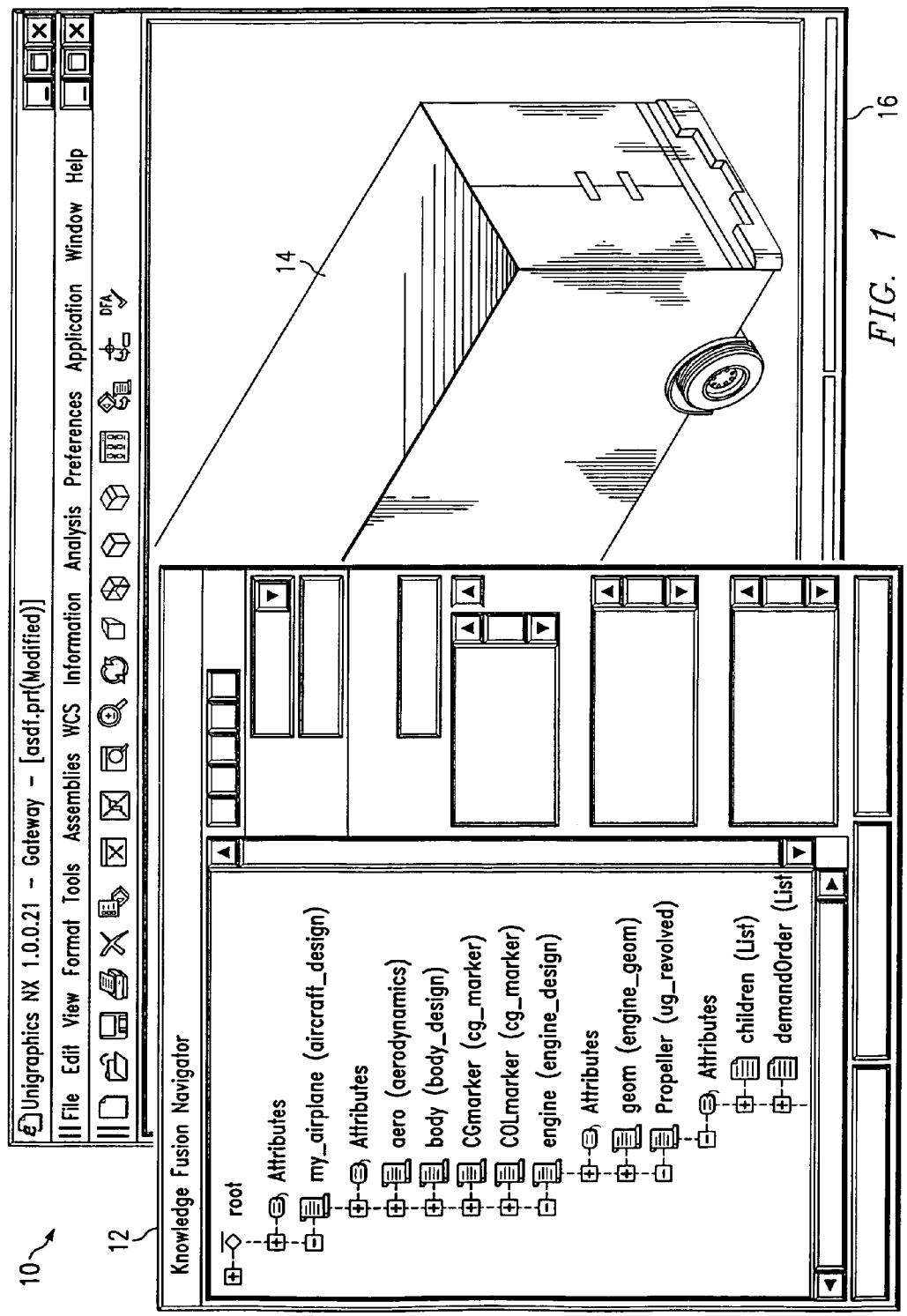
FIG. 1 illustrates an interactive design system.

FIG. 1 is a simplified block diagram of an interactive design system 10. One aspect of the present invention is to permit object creation to take place by simple, non-programmatic, and interactive techniques and to allow utilization of engineering rules and knowledge bases by making selected parameters of the object of interest known to the programming language. This removes the burden of programmatic object creation and enables the leveraging of the knowledge bases and the engineering rules in the language. The programming language provides a graphical user interface that allows for the application of engineering knowledge driven rules and design intent to geometric models and assemblies.

To achieve this aspect, a programming language application module 12 implements an adoption process where a subset of the defining parameters of an existing object 14 in a design application module 16 is exposed to the programming language through the attributes of the engineering rule that is automatically created in the programming language. Implementation of the adoption process is interactive. The user graphically picks from the interactive design system 10 the object 14 to be adopted and the system generates the appropriate language description defining the engineering rule and the attributes for the selected object 14. Through the engineering rule and its attributes, the programming language is able to change the characteristics of the object 14 even though the programming language does not have a complete description of the object 14. The attributes of the engineering rule for the object 14 and the complete definition of the object 14 in the interactive design system are maintained in synchrony. Changes to either the attributes or the description of the object 14 are reflected in each through an interface between design application module 16 and programming language application module 12 that is preferably incorporated within programming language application module 12. This approach achieves an associativity between the programming language and the design system.

Adoption is the process of exposing certain attributes of an existing object to the programming language wherein the existing object was not created by the programming language. When an object is adopted, a language view of the object is generated. An adopted class for the object is created and then instantiated via a textual representation of its attributes. Another approach is to allow the user to define a new feature type (rule object) through the programming language. The definition of the user proprietary feature is completely specified through the programming language. The user defined feature type is referred to as a knowledge feature and it can capture both geometric and non-geometric rules. The knowledge feature behaves like any other parametric feature object in an existing design system and the associativity between the programming language and the design system is preserved. The adoption technique allows for rapid integration of a computer aided design system with a programming language oriented knowledge based engineering system. The knowledge feature technique offers a quick and effective way to extend user defined knowledge objects and to extend the underlying computer aided design system for the user's proprietary use.

The entry points into the knowledge fusion programming language of interactive design system 10 is through the programming language application module 12. The main menu of the programming language application module 12 provides View, Tools, and Preferences options. The View option provides an entry for a Knowledge Fusion Navigator dialog box that shows an object tree for a single instance of a part or assembly. The Tools option provides for the opening of an Applications, Adoption, Rule Removal, Syntax, and Delayed Update dialog boxes. The Applications dialog box is the interface to dialogs created by the user. This dialog box allows access to any user created interface dialogs that have been made and stored. The Adoption dialog box allows for objects to be brought into the knowledge fusion programming language that were externally created in the interactive design system. Adoption exposes some or all of the attributes of these externally created objects for use in the knowledge fusion programming language. The Rule Removal dialog box allows for the removal of all rules from a current part or assembly without affecting its geometry. The Syntax dialog box provides for checking the syntax of one or more classes. The Delayed Update dialog box allows for the creation and editing of rules without updating the part or assembly until so desired. The Preferences option includes a Knowledge Fusion dialog box to allow for the specification of preferences for the display of attributes in the object tree of the Knowledge Fusion Navigator dialog box.

FIG. 2 shows an example of a Knowledge Fusion Navigator dialog box 20 displaying an object tree for the engineering rules of the knowledge fusion programming language for a single instance of an object. Each node in the object tree represents either an instance of a class or an attribute of a single instance of a class for the object. There are three types of nodes within the object tree that represent the engineering rules. A root node is at the base of the tree and has no parent. An instance node is an object in the object tree that represents an instance of a class. A child node is a subset of the instance node. Each root, instance, and child node may have attribute nodes associated therewith as part of the object tree. A corresponding graphics area is associated with the navigator dialog box. An engineering rule chosen in the object tree will highlight the corresponding object displayed in the graphics area. An object selected in the graphics area will have its node name displayed in an information window.

Table I shows the various attribute rules and their descriptions for the configuration of attributes associated with root, instance, and child nodes. The attribute rules are available in the attribute nodes of the object tree. The demandOrder rule allows for control of the order of dependency in how attributes update so that certain instance nodes update before others. For example, if the object tree has nodes A, B, and C, node C's demandOrder may list nodes A and B indicating that nodes A and B update before node C updates its attributes. The demandValue rule provides for the viewing of the value of an attribute. The index rule shows the position of the instance node in a child list. The inTree rule controls the showing attributes in the object tree. The localFrame rule provides the reference frame for the attribute. The NextHigherAncestor rule shows the what created the attribute. The onDelete rule determines whether the attribute can be deleted from outside of the knowledge fusion programming language. The onModify rule allows for the editing of the attribute outside of the knowledge fusion programming language. The onUndoAllocate rule allows for the releasing of system resources. The refChain rule provides the instance node associated with the attribute. The referenceFrame rule provides the orientation of the attribute defined by the NextHigherAncestor rule. The saveClass rule saves the class definition for the current node and those nodes beneath it. The saveClassList rule provides for the storage of a class definition as opposed to a null design. The saveValue rule provides for the storage of a value of the attribute on demand.

TABLE I

| Attributes | |
|---|---|
| demandOrder (List) | Lets you demand an instance to update before another instance. |
| demandValue (List) | Lets you show the value of an attribute on demand. |
| index (integer) | Shows the position of this instance in a child list. |
| inTree (Boolean) | Controls the visibility of an the instance in the KF Navigator. TRUE displays the instance. |
| localFrame (Frame) | The instance's reference frame. It is derived from the referenceFrame. The localFrame cannot be edited. |

TABLE I-continued

| Attributes | |
|---|---|
| NHA (Instance) | This is the NextHigherAncestor. It is the instance that created the object. |
| onDelete? (Boolean) | TRUE means the instance can be deleted outside of UG/KF. |
| onModify (Boolean) | TRUE means the instance can be edited outside of UG/KF. |
| onUndoAllocate (Boolean) | Method for your to release any system resources on UNDO. |
| refChain (String) | The name of the instance in UG/KF. |
| referenceFrame (Frame) | The orientation defined by the NHA. |
| saveClass? (Boolean) | TRUE means saves the class definitions for the current node and those beneath it. You can use this attribute by itself or together with saveClassList. |
| saveClassList (List) | Lets you store the actual class definition that may be defined by a NullDesign value if an If – > Then construct. Thus, instead of storing a nulldesign, the part file stores the class definition. You can use this attribute by itself or together with saveClass. |
| saveValue (List) | Lets you store the value of an attribute on demand. |

FIGS. 3A-D show various pop-up menus for the different areas of the Knowledge Fusion Navigator dialog box. Nodes in the object tree are divided into two categories, nodes that represent instances of classes including root and instance nodes and nodes that represent non-instance rules including attribute nodes. The type of node under the cursor determines which pop-up menu is displayed. FIG. 3A shows the pop-up menu that is displayed when a root node is selected. FIG. 3B shows the pop-up menu displayed when an instance node is selected. FIG. 3C shows the pop-up menu displayed when an attribute node is selected. FIG. 3D shows a pop-up menu when the background of the Knowledge Fusion Navigator dialog box is selected. Pop-up menus may be designed to appear, for example, through a right click mouse operation while the mouse cursor is over the desired area. Each pop-up menu provides various options related to the underlying node or background.

In FIG. 3A, the pop-up menu options that may be available at the root node include Edit, Add Attribute, Add Child Rule, List Dependencies, Inspect, Class Documentation, List Rules, Reload Selected Classes, Reload All, Rebuild Tree, Delete Rule and Object, and Remove Rule Only. The Edit option displays an Edit Child Rule dialog box to permit editing of attributes. The Add Attribute option allows for a user defined attribute to be added at the root level. The Add Child Rule option allows for a child rule to be added at the root level. The List Dependencies option opens an Information dialog box displaying what classes objects or attribute rules previously chosen from the object tree are dependent on and what classes that are dependent on them. The Inspect option opens an Instance Inspector dialog box displaying attribute rules from the object tree. The Class Documentation option displays documentation for the node. The List Rules option provides for viewing of existing dynamic rules. The Reload Selected Classes option provides for the reloading of multiple classes previously selected from the object tree. The Reload All option causes the user class definition file to recompile. The Rebuild Tree option provides for updating the object tree after a class has been edited. The Delete Rule and Object option removes the currently selected child rule from the node and deletes any associated geometry. The Remove Rule Only option allows for the removal of an established rule without affecting the associated geometry.

In FIG. 3B, the pop-up menu options that may be available at the instance node include Edit, Add Attribute, Reference, List Dependencies, Inspect, Class Documentation, List Rules, Reload This Class, Reload All, Rebuild Tree, Delete Rule and Object, and Remove Rule Only. The Edit, Add Attribute, List Dependencies, Inspect, Class Documentation, Reload All, Rebuild Tree, Delete Rule and Object, and Remove Rule Only options provide similar functions as found at the root node. The Reference option creates a reference chain for the underlying instance node and inserts the reference chain at the current text position for the rule being edited. The Reload This Class option reloads the class for the underlying instance node.

In FIG. 3C, the pop-up menu options available at the attribute node include Edit/View, Show Value, Show Dependents/Dependencies, Delete, and Reference. The Edit/View option provides a capability to edit the attribute rule if available. The Edit/View option opens a View Attribute dialog box. Attribute rules may be viewed and, if the attribute rule is editable, edited as desired. The Show Value option provides for the value of the underlying attribute rule to be shown in the object tree. The Show Dependents/Dependencies option opens an Information dialog box displaying what classes that objects and attribute rules previously chosen from the object tree are dependent on and what classes are dependent on them. The Delete option allows for the removal of the underlying attribute rule. The Reference option causes the correct reference chain for a selected attribute rule to be inserted at the current text position for the underlying attribute rule being edited.

In FIG. 3D, the pop-up menu options available in the background area include Add Attribute to Root, Add Child Rule to Root, Reload All, Rebuild Tree, and Reference by Select. The Add Attribute to Root option allows for the adding of a user defined attribute rule at the root node. The Add Child Rule to Root allows for the adding of a child rule at the root node. The Reload All option is used if one or more DFA files are edited. The user class definition file will be recompiled open opening a session. The recompile will occur within the current session if the Reload All option is performed at the root node pop-up menu. The Rebuild Tree option provides for the updating of the object tree after a class has been edited. The Reference by Select option provides for the object identifier for objects to be obtained directly from the graphics window using a Class Selection dialog box.

Figure 4:
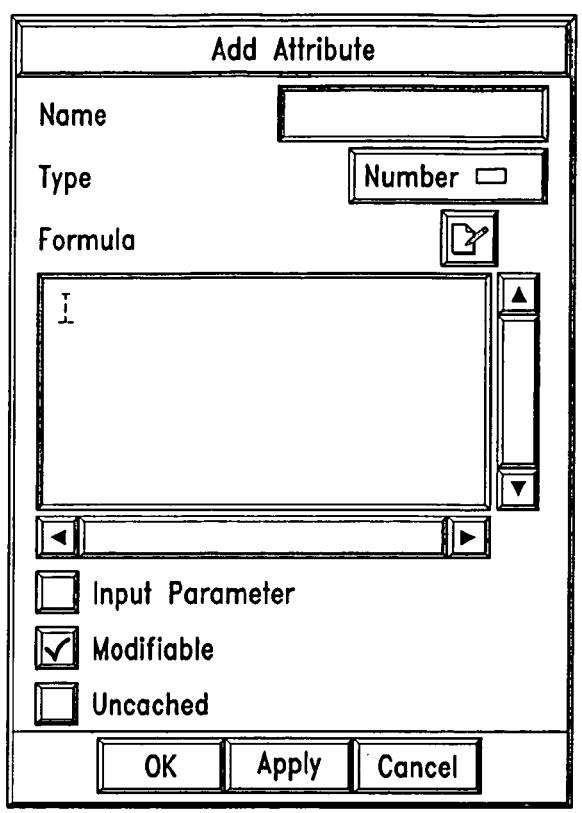
FIG. 4 illustrates a dialog box for adding an attribute rule to the object tree.

FIG. 4 shows an Add Attribute dialog box for adding an attribute rule. The Add Attribute dialog box is accessed through the Add Attribute option of the root node, instance node, or background pop-up menus. The different inputs for the Add Attribute dialog box include Name, Type, Formula, Extended Text Entry, Input Parameter, Modifiable, Uncached, and Action. The Name input provides for the entering a name for the attribute rule. The Type input allows for the specification of the data type for the attribute rule. The Formula inout provides for the entering of a value for the attribute rule. The Extended Text Entry input opens a dialog box to provide more room to compose the attribute rule. Once entered, the text for attribute rule is moved to a Rule for Parameter box. The Input Parameter input specifies that the attribute rule is a parameter to the class and might receive a value when the class is instantiated. The Modifiable input specifies that the value of the attribute rule may be externally set. The Uncached input specifies whether the value of the attribute rule is saved in memory. The value of the attribute rule is recalculated each time it is referenced by another attribute rule. The Action input provides an OK, Apply, and Cancel selection. The OK selection applies any changes made to the attribute rule and closes the ADD Attribute dialog box. The Apply selection performs the changes and keeps the Add Attribute dialog box open. The Cancel selection does not make any changes to the attribute rule and closes the Add Attribute dialog box.

A value for an attribute rule has a range specified by its type. A data type for an attribute rule includes Boolean, Frame, Integer, List, Name, Number, Point, String, Vector, Instance, User, Any, and Group. The Boolean type indicates either true or false. The Frame type defines a local coordinate system. The Integer type can be a positive or negative whole number or zero. The List type is an ordered set of other types. The Name type is a symbolic constant, an unquoted sequence of alphanumeric characters, which may be used to refer to the name of the attribute rule. The Number type is a number that can have a decimal value such as a double precision floating point number and is preferably the default data type. The Point type is a point object. The String type is a double quoted sequence of characters. The Vector type is a vector object. The Instance type is an instance of a class. The User type is a 32 bit value not interpreted by the language system. The Any type specifies that the value can hold any data type. The Group type specifies a group rule that provides a transformation to compute canonical parameters, as in required parameters for instantiation, from alternate parameters. For example, the canonical parameters for an arc are its localFrame, defining its center and orientation, and its radius. A group rule for the arc computes the radius if the diameter is supplied.

The following is an example procedure of adding attribute rules to get a sine calculation. The procedure adds an attribute rule named NUM_DEGREE to hold the value for the number of degrees used for the sine calculation. An attribute rule named SINE is added that uses a built in sine function to obtain a sine value for the value provided by NUM_DEGREE. After obtaining the sine value, the value for NUM_DEGREE can be edited to obtain a new value.

At the root node pop-up menu, the Add Attribute option is selected and the Add Attribute dialog box is displayed. In the Name input, NUM_DEGREE is entered. The Number data type is chosen for the Type input. In the Formula input, the value of 30 is entered. The Input Parameter input and the Modifiable input are toggled ON and the Apply selection is chosen. The Add Attribute dialog box remains after the Apply selection is chosen and SINE is entered in the Name input. The Number data type is chosen for the Type input and NUM_DEGREE is entered in the Formula input, where the : references the value for the attribute rule as opposed to its name. The Input Parameter and Modifiable inputs are toggled ON and the Apply selection is chosen. In the object tree, the SINE attribute rule is selected and the showValue option in the pop-up menu is chosen. A value of 0.5 will be displayed for the SINE attribute rule. To obtain a new value, the NUM_DEGREE attribute rule is selected and the Edit option in the pop-up menu is chosen. In the Formula input of an Edit Attribute window, the value of 30 is changed to 45 and the OK selection is chosen. In the object tree, the SINE attribute rule is selected and the showValue option in the pop-up menu is chosen. A value of 0.70710678119 will be displayed for the SINE attribute rule.

Figure 5:
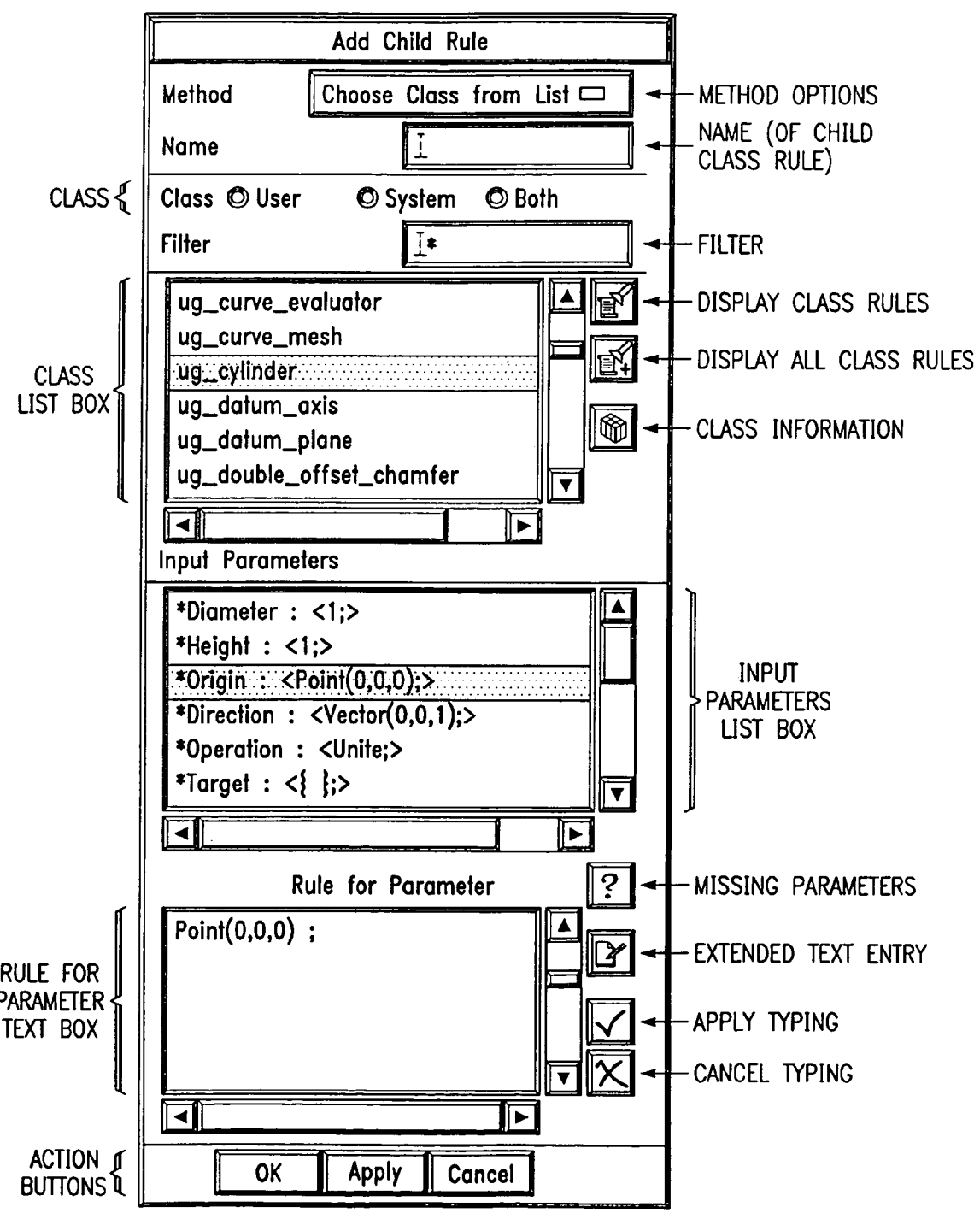
FIG. 5 illustrates a dialog box for adding or editing a child rule to the object tree.

FIG. 5 shows the dialog box for editing or adding a child rule. A child rule can be edited by selecting the child node from the object tree. A child rule can be added by selecting the Add Child Rule option from the root node pop up menu. The options available in the Edit/Add Child Rule dialog box include Method, Name, Class, Filter, Class List Box, Display Class Rules, Display All Class Rules, Class Information, Rule for Parameter, Input Parameter, Missing Parameters, Extended Text Entry, Apply Typing, Cancel Typing, and Action. The Method option provides for the selection of class rules for the class displayed in the Class List Box. The Method option also provides for the display of only rules for the instance node and allows for specification of a rule by typing in a formula. The Name option provides an input area of an appropriate name when adding a child rule. The Class option determines what classes are displayed in the Class List Box. The User button provides for the display of user defined classes only. The System button provides for the display of system defined classes. The Both button provides for the display of user and system defined classes. The Filter option provides for the display of the class names in the Class List Box determined by the entered filter mask. The Class List Box displays the child rule classes for selection. The Display Class Rules option allows for the display of rules of the class highlighted in the Class List Box. The Display All Class Rules option provides for the display of all class rules for the chosen class including ancestors of the class. The Class Information option provides for the display of documentation for the class under the cursor. The Rule for Parameter option displays parameter rules from selections made in the Input Parameter option for the selected class. The Input Parameter option displays the input parameters for the class selected in the Class List Box. The Missing Parameters option displays what parameters are still needed before the Child Rule is fully defined. The Extended Text Entry option increases the size of the dialog box to allow for more room to compose a rule. When finished composing, the composed rule can then be moved to the Rule for Parameter box. The Apply Typing option applies the designated value to the parameter shown in the Rule for Parameter box. The Input Parameters box updates with the value and the Rule for Parameter box is cleared. The, Cancel Typing option discards typing on the current parameter and clears the Rule for Parameter box. The Action option includes the OK selection to apply changes and dismiss the dialog box, the Apply selection to apply the changes and retain the dialog box open, and the Cancel selection to dismiss the dialog box and not apply any changes.

To edit a child rule, a child rule to edit is selected from the Input Parameter option. A specific input parameter of the child rule is selected for editing. The child rule is edited in the Rule for Parameter option. The editing takes effect by selecting the Apply Typing option and the Apply Action button.

An example follows for adding a child rule to the class ug_arc in order to add an arc to the graphics display. At the Knowledge Fusion Navigator dialog box, a root node is chosen and its pop up menu is displayed. The Add Child Rule option is selected and the Add Child Rule dialog box appears. In the Name option, arc1 is entered. The Class List Box is scrolled until the ug_arc class appears at which point is then selected. The Input Parameters box fills with default parameters to define the arc. One of the default parameters is *End_Angle:<360:> which is chosen for this example. The value of 360 is displayed in the Rule for Parameter box. The value of 360 is then edited to a value of 135. The Apply Typing option updates the new value in the Input Parameters box and clears the Rule for Parameter box. The Apply or OK selection from the Action option is chosen. The arc displays in the graphics window and the instance displays in the object tree of the Knowledge Fusion Navigator dialog box.

The Reference by Select option provides an ability to interactively obtain the identifier for an object by selecting it from the graphics window. For example, to input an edge into an edge blending class, such as ug_edge_blend, the edge can be referenced by selecting it. From the Knowledge Fusion Navigator dialog box, instance a class that requires a name or object, identifier such as ug_edge_blend, as in using Add Child Rule for ug_edge_blend. Next, choose an appropriate input parameter, as in selecting Edge_Blend_References from ug_edge_blend. The cursor can be hovered over any blank background area of the Knowledge Fusion Navigator dialog box and clicked to choose the Reference by Select option. A Class Selection dialog box displays and the desired edge to reference can be selected. The rule for the edge will appear in the input parameter list either as an instance name or a host pointer function.

Figure 6:
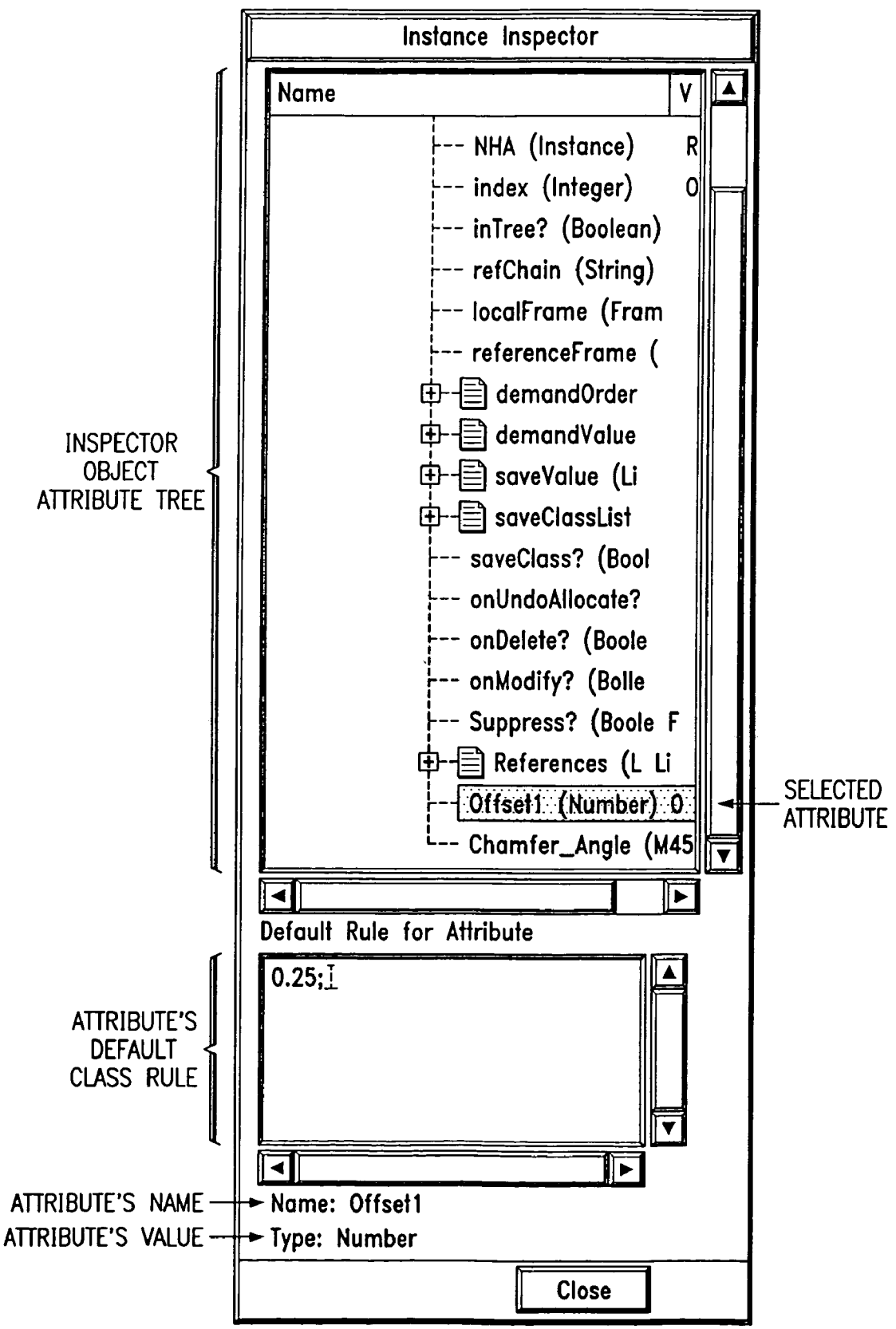
FIG. 6 illustrates a dialog box for inspecting an instance of the object tree.

FIG. 6 shows an example of an Inspect Instance dialog box. The Inspect Instance dialog box displays when an instance is selected from the object tree. The Inspect Instance dialog box allows for the inspection of any of the instance attributes rules. Any number of Inspect Instance dialog boxes may be opened. Text from the Default Rule for Attribute panel may be copied and pasted into an input text box of another dialog box.

Figure 7:
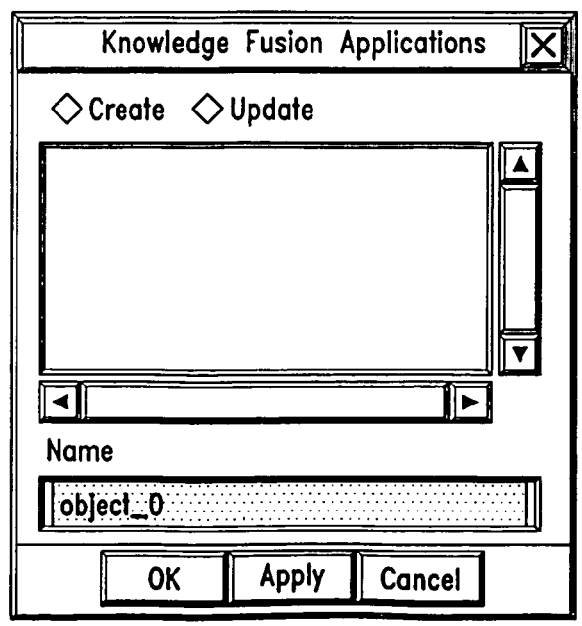
FIG. 7 illustrates an applications dialog box for accessing dialog files.

FIG. 7 shows an example of an Applications dialog box. The Applications dialog box is the interface to dialogs created by the user. From the Applications dialog box, any user created interface dialogs that exist and are stored as <filename>.dlg files may, be accessed. The Applications dialog box features Create and Update buttons in order to create a new instance of a class (child rule) or edit an existing child rule. In Create mode, a Name field is used to create a new instance of a class under the root level of the tree. The Update mode requires the selection of an instance of a class using a selection in the graphics area. The panel within the Applications dialog box will include the available classes having matching dialog files. In Create mode, the panel will include all possible classes for which a dialog file is found. In Update mode, the panel includes entries that could match at some level of the reference chain. A Name field is provided to enter a name of an entity to create. A custom dialog box may be launched upon entering a new name. Graphical selection is supported from this dialog box in order to choose an entity for update. In most cases, the geometry selected may not be the actual class that will be modified so any matching dialogs for the reference chain to the selected entity will be presented. For example, if a line that is part of a piston that is part of an engine is selected, the reference chain may be root:myengine:mypiston:a_line:. Any dialog files for the class root:myengine:mypiston: would be searched for and presented. If the dialog file engine.dlg was found, then it would appear in the selection list as a possible class to modify.

The preferred approach used to connect a dialog file to a class is through naming conventions. A dialog file is associated with a class via the matching of the name of the class and the name of the dialog file. If the class is called piston, the associated dialog file would be piston.dlg. In a similar manner, a parameter or rule inside a class is associated by name matching. In order to immediately update a class and dialog file, a callback function may be implemented. Callbacks may be automatically attached to OK and Apply buttons as well as to each action button and button in button layout. The OK option performs the expected operations of updating the values from the dialog file to the class and collapses the dialog box. The Apply callback is bi-directional in that it will read back the current values of the class in order to update the dialog file after the parameters of the class have been updated. This is performed so that any values calculated in the class can be used as feedback to the user. For example, the parameters might be Height and Width and the feedback to the user might be Area (Height*Width). After updating the Height and Width parameters, the value for Area will be updated in the dialog file.

The default action for the Apply option is to create an instance of a class and then go into an edit mode. By changing the Apply callback to a Create callback, it changes the behavior of the Apply option so that it continues to be in create mode. After the creation of an object, a new object name will be generated by incrementing and appending a number to the original object name. Using this feature, the dialog file can be used to create multiple objects without exiting the dialog box.

Action buttons in the dialog box may have a special callback function that can invoke point, vector, and csys subfunctions. In order to perform this operation, the action button (or button in a layout) is associated with a point, vector, or frame. When an action button is selected, the type of the attribute is analyzed in order to determine which of the point, vector, or csys subfunctions is appropriate. A button can be associated with a particular member of a class either by directly matching the name or by matching the name plus an extension such as _FUNC or _FILE. The second method allows for the attaching of both a text entry field and an action button to the same variable. The extension _FUNC may be used for the point, vector, csys, and selection functions. The extension _FILE may be used for strings to display the file selection box. For example, a point variable called BasePt may have a string entry field called BasePt in the dialog file and an action button named BasePt_FUNC. Both user interface objects would be available for setting the value of the variable. The string field is kept in synchronization with any change made to the point function from the action button.

Other special callback functions for user interface objects or post construct callback on the dialog file include Refresh and Update. These callbacks allow for more immediate of the dialog file with changes to the user interface. The Refresh callback takes the current contents of the dialog file and uses that data to create or update a rule. A full update is generally not performed and thus geometry is not created or updated. After the rule is updated, any changes to values or presentation are read back and displayed. The Update callback performs a full update to include the geometry. As an example, a bitmap in a dialog file may changed when a user changes a selection in an option menu. To implement this change, the Refresh callback is entered for the name of the activate callback on the option menu. At run time, the Refresh callback is executed when the user changes the selected option. This will immediately create or update the rule and then read back changes to the dialog file. In another example, a Refresh callback may be implemented on a single select list to have those selections make immediate changes and then implement an Update callback. The Refresh or Update callback may also be used with the post constructor callback for the dialog file. When Refresh is used as a post constructor callback, the initial instance of the class is immediately created when the dialog file first appears and the rules are evaluated in order to determine the state of the dialog file. The Update callback works in a similar fashion except that a full update is performed which will fully create the rule and the associated geometry. Unlike the Update callback, the Refresh callback does not fully create a rule as the rule will be removed upon selecting Cancel after only a Refresh operation.

FIGS. 8A-C shows pre-defined sets of translations from the user interface objects to the rules. FIG. 8A shows basic translations describing which user interface objects have translations applied to various data types. FIG. 8B shows extended translations used to control specific attributes of the user interface objects from a class. FIG. 8C shows which extended translations are supported by the various user interface objects. For example, an extended translation would allow the class to control the text label of an integer text entry field or the minimum and maximum limits of a scale. Extended translations allow for a limited programmability in the dialog file that is controlled by the class. Extended translations are implemented using a naming convention. Each extended translation uses a string suffix in order to reference a particular attribute of a user interface object. The data type corresponds to Number, Integer, String, Point, and Vector and indicates which data type can be used as a control for the user interface object. For example, to control the sensitivity of an option menu named Block_Size, an integer attribute called Block_Size_Visi is created. When Block_Size_Visi has a value of zero, then the option menu would be insensitive. When the attribute has a value of one, the option menu would become sensitive.

Figure 9A:
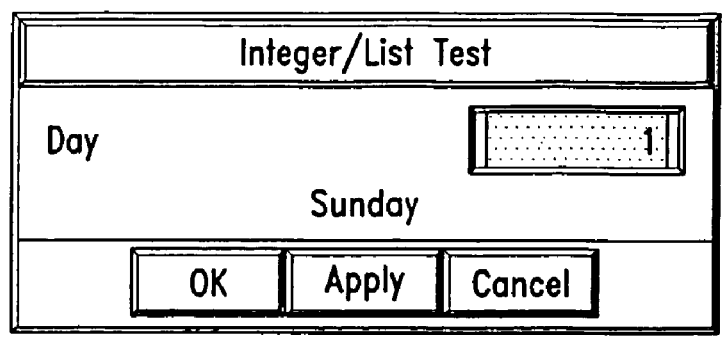
FIGS. 9A-C illustrate the interfacing between a class and a dialog file.
Figure 9B:
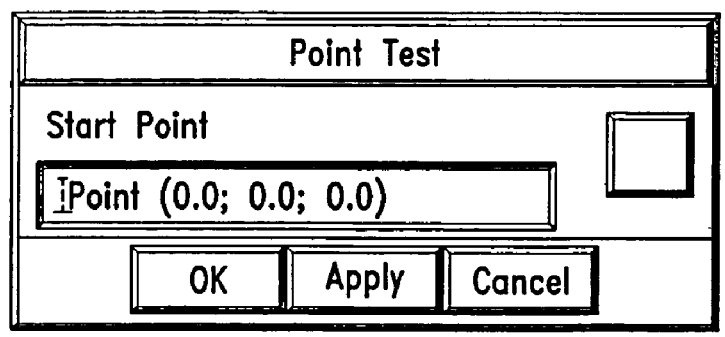
Figure 9C:
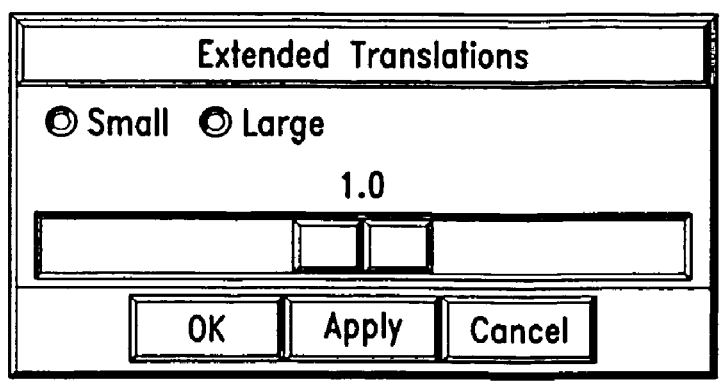

FIGS. 9A-C show example of how a class and a dialog file interface with each other. The examples include fragments of code and a description of user interface objects and interactions. In FIG. 9A, an item from a list is to be selected and display the selected item in a dialog box using a label. The class definition may be (Integer Parameter) day_index: 1; (List) day_list: {: Sunday: ; : Monday: ; : Tuesday: ; : Wednesday: }; (String) day_value: nth(day_index:; day_list:);. The object identifier for the integer entry field in the dialog box would be given the name day_index and the object identifier for the label would have the name day_value. The integer field follows the convention that the first item in the list is 1. During initial creation, the list item would be blank. Once Apply is invoked in the dialog box, the label will update with the appropriate string term from the list in the class. The only actual parameter into the class is day_index. This same task may also be performed using an option menu where the items in the menu were the days of the week and the option menu was given day_index as the object identifier.

In FIG. 9B, a point parameter is to be driven using either a text entry field or through the point creation function. A fragment of the class definition is (Point Parameter) start_point: Point{0, 0, 0, 0, 0, 0};. The text entry area would be given the object identifier start_point and the action button would have an object identifier of start_point_func. The text entry area shows the initial default value for the point. The point value can be either edited in the text entry area and press Apply or by pressing the ". . . " option. This option button invokes the point constructor dialog box to allow for the definition of the point. The coordinates for the point will then be inserted into the text entry area. The point may also be entered by naming the action button start_point. There will not be any feedback in the dialog box for this operation but the operation will work accordingly.

In FIG. 9C, the limits on a Scale Real object using rules in the class are controlled. The class definition is (Integer Parameter) scale_select: 1; (Number Parameter) scale_factor: 1.0; (Number) scale_factor_min: 0.02; (Number) scale_factor_max: if (scale_select:=1) then 2.0 else 4.0;. The radio box would have an object identifier of scale_select in order to control range of the scale. The scale object would have an object identifier of scale_factor. According to extended translations, the rules for scale_factor_min and scale_factor_max will be automatically associated with the scale object. Changing the radio button in the dialog box and selecting Apply would update the maximum limit for the scale to either 2.0 or 4.0. At create time, the minimum and maximum limits for the scale will come from dialog file defaults. This is because the maximum value is an equation that cannot be evaluated until after the class instance has been created.

As previously stated, adoption is the process of capturing some or all of the parameters of an existing externally created object for use in the knowledge fusion programming language environment. In this manner, the adopted object falls under the control of the rules of the knowledge fusion programming language. This includes the ability to adopt a created user defined feature. The Adopt Existing Object option from the main menu (Tools→Knowledge Fusion→Adopt Existing Object) opens the standard Class Selection dialog box which allows for the selection of externally created objects for adoption. Adoption is particularly useful in cases where there is a desire to interactively create a feature and then adopt it for further interaction under the knowledge fusion programming language. Features, bodies, curves, and other object types can be adopted. Features included in class definitions are directly adoptable in that their defining parameters appear in the Input Parameters list box and are available for edit. The presentation of adopted externally created features are represented as expressions added as children to that feature in the object tree and do not appear in the Input Parameters list box. As an example, the creation parameters for a boss, an externally created object, are Diameter, Height, and Taper Angle. Once a boss is adopted, these three parameters appear in the object tree as children expressions under the adopted boss. In this fashion, these parameters can then be selected and edited. An object can be fully adopted when it has its own DFA file defined for it. For example, a block feature can be fully adopted since a DFA file ug_block.dfa exists. If there is no DFA filed defined for the object, then the object can only be partially adopted. For example, a boss feature is only partially adopted since there is no ug_boss.dfa file associated therewith. A boss feature is adopted via a ug_feature.dfa file. Objects that are fully adopted can be generated solely by their rules. Objects that are partially adopted cannot be created from scratch but provide an interface to some of the object's defining data. To adopt an object, the Adopt Existing Object option is selected and the Class Selection dialog box is opened. Objects for adoption are selected from the graphics area or from a model navigation tool. The Knowledge Fusion Navigator dialog box can be opened to show the adopted object within the object tree.

Figure 10:
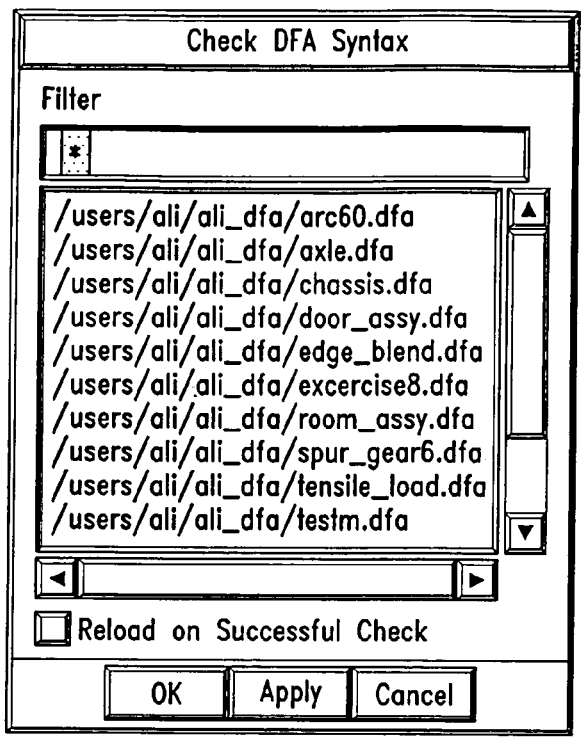
FIG. 10 illustrates a syntax dialog box.

FIG. 10 shows the Check DFA File Syntax dialog box. All the DFA files in the current search path for user classes are displayed therein with an ability to choose one or more for selection. Selecting the OK or Apply options causes the system to check the syntax of the selected DFA files. A result is then displayed in a listing window. The Syntax dialog box has a toggle button labeled Reload on Successful Check. When this toggle button is set, the DFA file reloads if the syntax check produces no errors.

Figure 11:
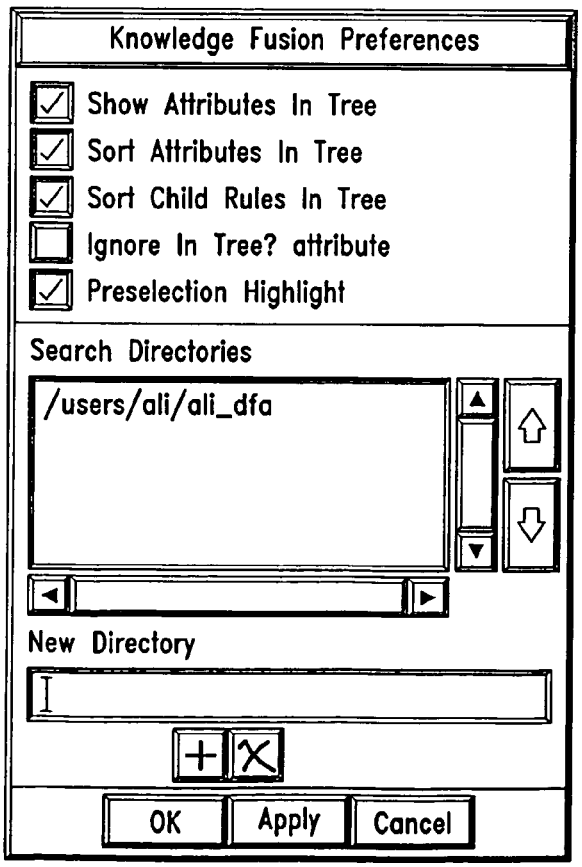
FIG. 11 illustrates a preferences dialog box.

FIG. 11 shows a Preferences dialog box. The Preferences dialog box provides for the modification of the display of the object tree and can set various preferences associated with the knowledge fusion programming language. The Preferences dialog box includes a Show Attributes in Tree option that, when toggled on, allows for the display of root attributes and those of any child rules in the object tree. A Sort Attributes in Tree option sorts attributes alphabetically when toggled on and sorts attributes in the order defined in the DFA file when toggled off. A Sort Child Rules in Tree option sorts child rules alphabetically when toggled on and sorts the child rules according to the order defined by the DFA file when toggled off. The Ignore in Tree option allows for objects that were previously made invisible visible again in the object tree. The Preselection Highlight option allows for an object in the graphics window to be highlighted when the cursor is passed over its corresponding instance attribute. The Search Directories List Box displays a set of search paths for use in finding DFA files. The search order precedence is from top to bottom in the list box and can be changed using the Up/Down arrows. To change the search order precedence, the search path desired to be changed is selected and its precedence is lowered using the Down arrow or raised using the Up arrow, the new search order precedence can be set by selecting the OK or Apply buttons. A New Directory field provides for the ability to enter a name of a search path or displays a search path selected from the Search Directories list box. A +(Add) option allows for the addition of a search path to the Search Directories list box while a X(Remove) option allows for the removal of a search path from the Search Directories list box. As an example of the use of the Preferences dialog box, there is an option of making selected objects in the object tree invisible. The object of interest is selected from the object tree. A pop up menu is opened to display the Edit Child Rule dialog box where the input parameter in Tree? in the Input Parameter list box is changed from True to False. When completed, the object will no longer appear in the object tree. To recover the object in the object tree, the Preferences dialog box is opened and the Ignore in Tree option is toggled on. This action causes all invisible objects in the object tree to reappear.

The knowledge fusion programming language provides for various customer defaults and environmental variables for proper configuration. Customer defaults include directories, objects, and attributes. The directories default allows for the specification of where user defined DFA search directories are defined. Setting this option to yes indicates that the search directories are to be read from a registry. The user is able to modify the search directories and that modification is stored in the registry between sessions. Setting this option to no indicates that the search directories are to be read from the user class directory environmental variable and no modification is permitted. The objects default allows users to define their own prefix for a name used in creating an object. The prefix supplied here will have an ascending number appended for the object name. If this option is not set, then no default name is supplied when the user creates an object. One format may be ug_kf_default_object_name: prefix with an example of ug_kf_default_object_name: object where the first object is object_1 and the second object is object_2. The attributes default allows users to define their own prefix for a name when new attributes are created. The prefix supplied here will also have an ascending number appended for the attribute name. If this option is not set, then no default name is supplied when the user creates an attribute. One format may be ug_kf_default_attribute_name: prefix with an example of ug_kf_default_attribute_name: object where the first attribute is attribute_1 and the second attribute is attribute_2.

Environmental variables include Class Directory, User Class Directory, Document Directory, and Document URL. The Class Directory variable points to a directory having all the predefined system class files (.dfa files). The User Class Directory variable is a search path that points to one or more directories where user defined class files (.dfa files) reside. The Document Directory variable points to the directory where documentation files for a selected user class are stored. The Document URL variable specifies a URL address where the documentation files can be found.

The knowledge feature technique provides a powerful tool to enable users to define their own features. Knowledge features have a similar behavior as any other externally created feature, a knowledge feature has a time stamp and will reevaluate itself in response to an update. To create a knowledge feature, a user creates a DFA file to define a specific knowledge feature. Depending on the application, the user can invoke an Open C function from the DFA file and develop the C user function for creating geometry and/or engineering calculations.

The first step in creating a knowledge feature is to define the knowledge feature in a DFA file. The specific knowledge feature is an instance of a mixin class. The DFA file for the knowledge feature includes various attributes. These attributes set whether the knowledge feature can be edited, deleted, suppressed, reordered, inquired, moved and creates any solid geometry. Other attributes may also be specified in the DFA file. Attributes that control an error handling mechanism include error number, error code, and error string. Appendix A shows an example of a generic DFA file for a knowledge feature showing various types of attributes.

An example of a specific knowledge feature is a weight checker for a car door design. Weight can be a constant threat to a door. If the door is too heavy, it takes too much force to open and close. The weight will determine the size of door hinges. The weight checker knowledge feature will be associative to the door body in the graphics window. When the door design is changed, the update mechanism will trigger the weight checker to validate the door weight which is equal to the body volume times the material density. If the weight checker returns an error, then the door body will not be updated according to the design changes. Thus, the designer can concurrently realize the impact of a design change and revise accordingly. The designer can specify a weight range in the weight checker DFA file. In addition to attributes of a generic knowledge feature, a weight checker DFA file defines attributes specifically for the weight checker knowledge feature. Appendix B shows the specifics for the weight checker knowledge feature.

Figure 12A:
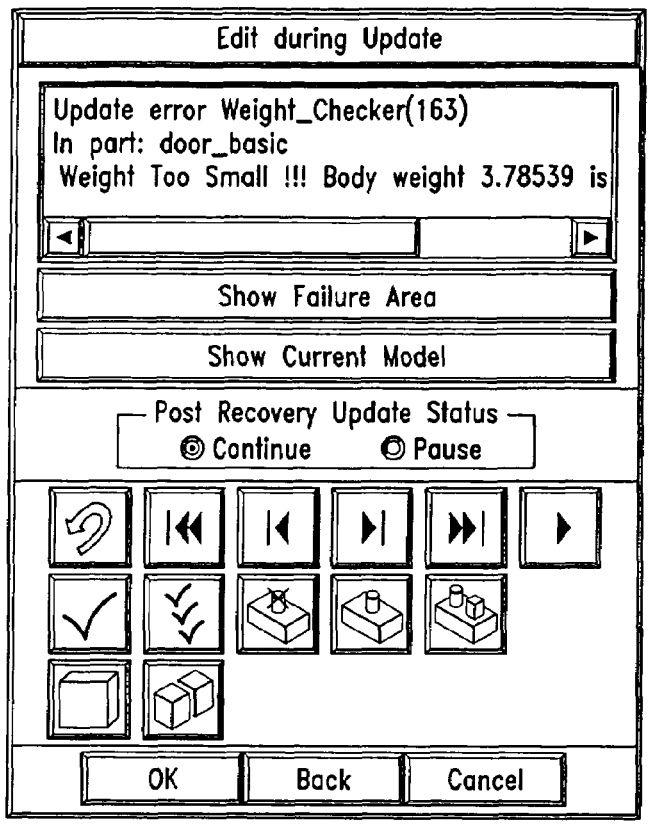
FIGS. 12A-B illustrate an example process for using a specific knowledge feature.
Figure 12B:
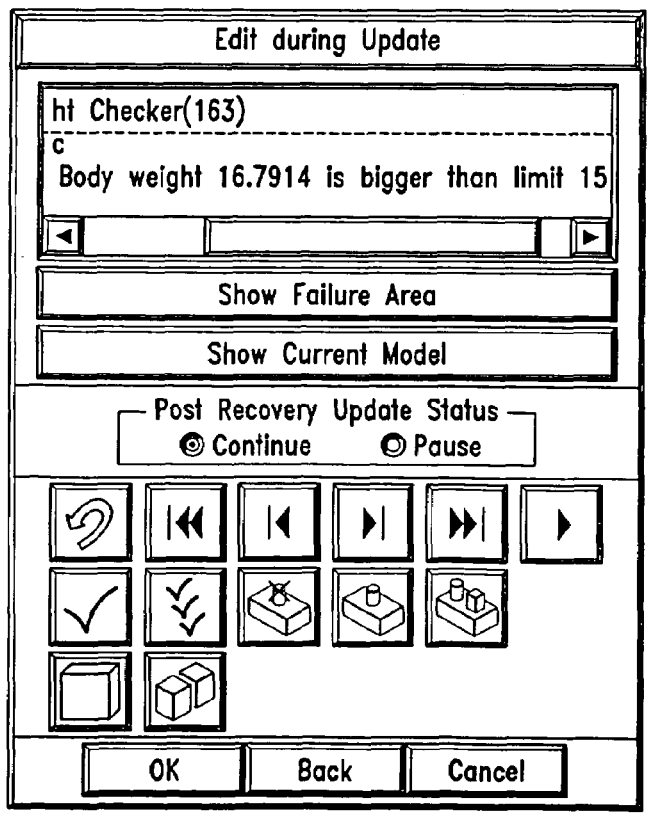

FIGS. 12A-B show an example process for using the weight checker knowledge feature. First the part file corresponding to the car door, door_basic.prt, is opened. The solid body to adopt is selected through the Adopt existing Object option. The attributes of the adopted rule are then checked, for example the Volume (Number) is checked to see its Value (0.001398). A child rule is added for the door material using the name door_material and a selected class dw_material, and a material type (302) is assigned to the child rule. A material density value (7.916) is available for the selected material type. Under the root, an attribute door_mass is added with a formula associated therewith solid_body:Volume:*door_material:MaterialDensity: *1000. The new attribute door_mass now shows a value (11.069 kg). A new child rule is then added with the name door_weight_check with a selected class dw_weight_check.

The values for weight (door_mass), LowEnd (5), and High-End (15) are set for this child rule. A new feature, Weight Checker, is now established. The weight checker knowledge feature can now be tested. If the door material is changed from 302 to 6061-T6, an error report will be displayed indicating "Weight Too Small!!! Body weight 3,792 is smaller than limit 5." If the door material is changed to H-99, an error report is displayed indicating "Weight Too Big!!! Body weight 16.8226 is bigger than limit 15. If door dimensions are changed, the weight checker knowledge feature will validate it before the dimensions can be updated. In addition, other parameter checkers maybe easily defined, such as length checker and width checker, to protect against out of range modifications.

The knowledge fusion programming language is deeply embedded in the product development design system to allow engineers and designers to focus on producing products and not translating between a knowledge based engineering system and a product development system. For example, a computer aided design system with the imbedded knowledge fusion programming language allows designers to not only specify the requirements and rules to drive creation of the product, but also allows the designers to freely make geometric model changes from within the product development design system and still have a model that is completely consistent with and associatively linked to the engineering rules. Changes can be made directly to the engineering rules and/or the geometry without any loss of information due to the associativeness provided by the programming language. The programming language is able to capture and associatively apply the engineering expertise of each product development discipline and model the entire product design process at the abstract level. Critical non-geometric logic, such as product structures, development processes, standard engineering methods, and manufacturing rules, can be incorporated with the geometry.

An interactive user interface provides a visual rule editing environment with facilities to create, edit, and browse rules that control the parameters of graphics objects, a visual editor for adding or editing rules for a graphics part, inspectors for evaluating rules and examining results, links to external textual sources, and integration to design custom dialog boxes. The programming language provides facilities for the definition of user defined classes with support for multiple inheritance, access to external databases, and the ability to create geometry that is directly controlled by rules. The rules specify how various parameters and attributes of objects in a model are related to each other. The relationships may be expressed as formulas and captured in different ways through such techniques as database relations and programmed procedures. A program in the programming language defines a model of a physical or abstract system. An application developed in the programming language allows a user to enter or vary a variety of parameters. The system then uses the rules to calculate the effect of the parameter values and produces results derived therefrom. The ordering of operations need not be specified as the system can determine the order from the relationships defined by the formulas. The programming language allows a broad spectrum of users to utilize knowledge enabled computer aided design objects from within a familiar user interface environment while enabling knowledge application development teams to effectively leverage the talents of computer aided design application experts.

Thus, it is apparent that there has been provided, in accordance with the present invention, a method and system for designing a product that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statements made above that are not otherwise reflected in the appended claims.

APPENDIX A

```
DefClass: %ug_kf_feature (ug_feature):
    (boolean) %can_be_edited?:           TRUE;
    (boolean) %can_be_deleted?:          TRUE;
    (boolean) %can_be_suppressed?:       TRUE;
    (boolean) %can_be_reordered?:        TRUE;
    (boolean) %can_be_inquired?:         TRUE;
    (boolean) %can_be_moved?:            TRUE;
    (boolean) %on_solid?:                TRUE;
    (string) %icon_name          " ";
    (integer) %edit_dialog:;
    (integer) %inquire_dialog:;
#+
Output : A list containing two lists:
    1 - A list of expressions
    2 - A list of expression names
#-
    (list)      %ask_expression:{ };
#+
Output : A list of parents
#-
    (list)      %ask_parent{ };
    (string)    %ask_name:" ";
#+
NOTE:   For delete, suppress and apply, one list is input
        containing the parent objects already on the
        delete list. This list is named "%deleted_list:".
Input : A list of deleted parents ("%deleted_list:")
Output : A list which contains the following:
("%parent_deleted:")
        { boolean - A flag if TRUE add the feature to
delete.
        { }      - A list of objects to delete if the
flag is FALSE.
        }
#-
    (list modifiable) %deleted_list:;
    (list) %parent_deleted: { };
#-
NOTE:   For delete, suppress and apply, one list is input
        containing the parent objects already on the
        delete list. This list is named "%deleted_list:".
Input : A list of suppressed parents ("%deleted_list:")
Output : A list which contains the following:
("%parent_suppressed:")
        {boolean - A flag if TRUE add the feature to
suppress.
        { }      - A list of objects to suppress if
the flag is FALSE.
        }
#-
    (list) %parent_suppressed: { };
#+
Output : A list which contains the following:
        { point - Location.
        vector - Major axis
        vector - Minor Axis.
        }
#-
    (list) %ask_orientation: { };
#+
Output : A list which contains the following information:
        {inter          -error.
        integer         -Parasolid body.
        {list integer}  - A list of new Parasolid faces.
        {list integer}  - A list of new indexes to label
the faces.
        {list integer}  - A list of new Parasolid edges.
        {list integer}  - A list of new indexes to label
```

APPENDIX A-continued

```
the edges.
#-
    (list) %create_body: {0};
#-
NOTE:  For delete, suppress and apply, one list is input
       containing the parent objects already on the
       delete list. This list is named "%deleted_list:".
Input : A Parasolid target body.
       A list of deleted parents.
Output : A list which contains the following information:
{
    {inter          -error.
    boolean         -Flag if true add to delete.
    {list integer}  - A list of new Parasolid faces.
    {list integer}  - A list of new indexes to label
the faces.
    {list integer}  - A list of new Parasolid edges.
    {list integer}  - A list of new indexes to label
the edges.
}
#-
    (intger modifiable) %target_body:;
    (list)    %apply: {0};
#+
    Error_code - A list of strings and each string is an
error message.
    Error_number - The index in the Error_code list
which represents the current error, this number is the
same number which is returned by the apply and
create_body.
#-
    (list) %Error_code: {' '};
    (integer modifiable) %Error_number: 1;
    (sting): NTH (%Error_number:, %Error_code:);"
```

APPENDIX B

```
DefClass: DW_Weight_Check (%ug_kf_feature);):
    (number parameter modifiable)      Weight;:
    (number parameter modifiable)      LowEnd:5;
    (number parameter modifiable)      HighEnd:15;
    (boolean) %on_solid?:              FALSE;
    (string) %ask_name:                Weight_Checker";
(list)   %apply:ifWeight:<LowEnd: then
            {2}
         else if Weight:>HighEnd: then
            {1}
         else
            {0};
    (list%Error_code: {"Weight Too Big! ! !Body weight" +
format("%g", Weight:)+ "is bigger than limit" +
format("%g", HighEnd:),
            {"Weight Too Small! ! ! Body
weight" + format("%g", Weight:)+ "is smaller than limit" +
format("%g", LowEnd:),
Modify above dfa file, we can get Length Checker
DefClass: DW_Weight_Check(%ug_kf_feature);):
    (number parameter modifiable)      Length;:
    (number parameter modifiable)      LowEnd:10;
    (number parameter modifiable)      HighEnd:100;
    (boolean) %on_solid?:              FALSE;
    (string) %ask_name:                "Length_Checker";
(list)   %apply:ifLength:<LowEnd: then
            {2}
         else if Length:>HighEnd: then
            {1}
         else
            {0};
    (list%Error_code: {"Length Too Big! ! ! Body length" +
format("%g", Length:)+ "is bigger than limit" +
format("%g", HighEnd:),
            {"Length Too Small! ! ! Body
length" + format("%g", Length:)+ "is smaller than limit" +
format("%g", LowEnd:)};,
Material class definition for this sample:
#!UG/KD 17.0
```

APPENDIX B-continued

```
DefClass: dw_Material (ug_base_part);
(String Parameter Canonical) MATERIAL: "302";
#Density is g/cc
(List Property List: {
        {WOOD; "Oak"; 2.325; 35000; 22000;
9e6:0.0000165};
        {STEEL: "A242";
7.030; 70000; 50000; 29e6; 0.0000065};
        {Heavy:"H-99"; 12.030; 80000; 60000; 39e6;
0.0000165};
        {Plastic: "Molded-21";
1.494; 42000; 20000; 19e6; 0.0000165};
        {STAINLESS: "302";
7.916'125000; 75000; 28e6; 0.0000128};
        {COMPOSITE: "Fiber-36";
1.411; 70000; 34200; 10.6e6; 0.0000128};
        "ALUMINUM: "6061-
T6"; 2.712; 42000; 27000; 10e6;0.0000131};
        {;
        (List MaterialProperties: loop {
             for$list in PropertyList:;
             For $material is nth(2; $list)
             if$material = material: return$list;
        };
(Name)     GenericMaterial: nth(1; MaterialProperties:)
(Number)   MaterialDensity: nth(3; MaterialProperties:);
(Number)   UltimateStrength: nth(4; MaterialProperties);
(Number)   YieldStrength: nth(5: MaterialProperties:);
(Number)   Modulus: nth(6; MaterialProperties:);
(Number)   CTE: nth(y; MaterialProperties);
```

What is claimed is:

1. A method for designing and modeling a product in a knowledge based engineering environment, comprising:
    creating a geometry of an internally created object associated with an internal programming language;
    receiving an externally created object having a geometry created by an external programming language not associated with the internal programming language;
    capturing engineering rules related to the internally created object;
    identifying attributes related to the externally created object for processing by the internal programming language;
    associating the geometry of the internally created object to the engineering rules in the internal programming language such that changes made in the geometry of the internally created object are automatically reflected in the engineering rules and changes to the engineering rules are automatically reflected in the geometry of the internally created object;
    associating the geometry of the externally created object to the attributes such that changes made in the geometry of the externally created object are automatically reflected in the attributes and changes to the attributes are automatically reflected in the geometry of the externally created object;
    graphically displaying the geometry of the internally and externally created objects according to the changes made thereto or through the respective engineering rules or attributes.

2. The method of claim 1, further comprising:
    selecting the externally created object and the internally created object, the internally created object having an entire object description, the externally created object having a partial object description;
    automatically generating a language description of the externally created object and the internally created object.

3. The method of claim 2, wherein the language description of the internally created object includes one or more parameters of the internally created object, wherein the language description of the externally created object includes one or more parameters of the externally created object, the language description of the externally created object being a lesser description of the externally created object as compared to the object description of the internally created object.

4. The method of claim 3, further comprising:
adjusting the one or more parameters to change the internally created object and the externally created object without using the respective object description.

5. The method of claim 3, further comprising:
maintaining the parameters of the internally created object and the externally created object and the respective object description in synchrony.

6. The method of claim 1, further comprising:
creating a knowledge feature associated with either the internally created object or the externally created object, the knowledge feature defining parameter limits placed on the respective object.

7. The method of claim 6, further comprising:
making changes to the respective object either through the geometry of the internally or externally created objects or the engineering rules or the attributes;
verifying a validity of the changes through the knowledge feature.

8. The method of claim 7, further comprising:
applying the changes to the respective object in response to verification by the knowledge feature.

9. The method of claim 6, further comprising:
capturing geometric and/or non-geometric rules in the knowledge feature.

10. The method of claim 6, further comprising:
adjusting the parameter limits of the knowledge feature in order to alter the scope of changes that can be made to the respective object.

11. A system for designing and modeling a product in a knowledge based engineering environment, comprising:
a design application module operable to create a geometry for an internally created object associated with a product, the design application module operable to receive an externally created object associated with the product, the externally created object having a geometry not created by the design application module;
a knowledge based programming language module operable to define engineering rules that may be associated with the internally created object, the knowledge based programming language module operable to identify attributes for the externally created object;
an interface operable to associate the geometry of the internally created object with the engineering rules such that changes to the geometry of the internally created object are automatically reflected in the engineering rules and changes to the engineering rules are automatically reflected in the geometry of the internally created object, the interface operable to associate the geometry of the externally created object with the attributes such that changes to the geometry of the externally created object are automatically reflected in the attributes and changes to the attributes are automatically reflected in the geometry of the externally created object.

12. The system of claim 11, wherein the design application is a computer aided design system.

13. The system of claim 11, wherein the interface is incorporated within the knowledge based programming language module.

14. The system of claim 11, wherein the knowledge based programming language module is operable to generate a knowledge feature associated with the respective object, the knowledge feature operable to define parameter limits placed on the respective object.

15. The system of claim 14, wherein the knowledge based programming language module is operable to incorporate changes made to the geometry of the internally or externally created objects and/or the engineering rules or attributes in response to verification from the knowledge feature.

16. A computer readable medium having code for designing and modeling a product in a knowledge based engineering environment, wherein the code is operable to:
create a geometry of an internally created object associated with an internal programming language;
receive an externally created object having a geometry created by an external programming language not associated with the internal programming language;
capture engineering rules related to the internally created object;
identify attributes related to the externally created object for processing by the internal programming language;
associate the geometry of the internally created object to the engineering rules in the internal programming language such that changes made in the geometry of the internally created object are automatically reflected in the engineering rules and changes to the engineering rules are automatically reflected in the geometry of the internally created object;
associating the geometry of the externally created object to the attributes such that changes made in the geometry of the externally created object are automatically reflected in the attributes and changes to the attributes are automatically reflected in the geometry of the externally created object.

17. The computer readable medium of claim 16, wherein the code is further operable to:
automatically generate a language description of the respective object, the language description being a lesser description of the respective object as compared to a description of the respective object;
adjust one or more parameters of the language description to change the respective object without using the complete description of the respective object;
maintaining the one or more parameters of the language description in synchrony with the description of the respective object.

18. The computer readable medium of claim 16, wherein the code is further operable to:
create a knowledge feature associated with the respective object, the knowledge feature defining parameter limits placed on the respective object,
make changes to the respective object either through the geometry of the internally or externally created objects, the attributes, or the engineering rules,
verify a validity of the changes through the knowledge feature.

19. The computer readable medium of claim 18, wherein the code is further operable to:
apply the changes to the respective object in response to verification by the knowledge feature.

20. The computer readable medium of claim 18, wherein geometric and/or non-geometric rules are provided in the knowledge feature.

* * * * *